(12) United States Patent
Afshari

(10) Patent No.: US 7,089,698 B2
(45) Date of Patent: Aug. 15, 2006

(54) METHOD AND APPARATUS FOR CHARGING EFFLORESCENT MATERIAL UTILIZING ULTRA VIOLET LIGHT

(76) Inventor: Abbas Ben Afshari, P.O. Box 8005, Pocatello, ID (US) 83205

( * ) Notice: Subject to any disclaimer, the term of this patent is extended or adjusted under 35 U.S.C. 154(b) by 0 days.

(21) Appl. No.: 10/345,117

(22) Filed: Jan. 15, 2003

(65) Prior Publication Data

US 2004/0134114 A1    Jul. 15, 2004

(51) Int. Cl.
A01K 85/01    (2006.01)
F41G 1/34    (2006.01)

(52) U.S. Cl. ...................... 43/4.5; 250/459.1

(58) Field of Classification Search ............ 124/87; 33/241, 265; 42/123; 43/4.5, 17, 17.5, 17.6; 250/459.1, 461.1, 484.2
See application file for complete search history.

(56) References Cited

U.S. PATENT DOCUMENTS

| | | | | |
|---|---|---|---|---|
| 3,582,638 A | * | 6/1971 | Peters | 362/577 |
| 3,678,590 A | * | 7/1972 | Hayward | 42/132 |
| 3,880,529 A | * | 4/1975 | Althause et al. | 356/251 |
| 3,945,127 A | * | 3/1976 | Spencer | 33/265 |
| 4,030,203 A | * | 6/1977 | Ackerman, Jr. | 42/123 |
| 4,070,763 A | * | 1/1978 | Carts, Jr. | 42/132 |
| 4,166,324 A | * | 9/1979 | Carollo et al. | 42/132 |
| 4,170,071 A | * | 10/1979 | Mann et al. | 33/265 |
| 4,177,572 A | * | 12/1979 | Hindes | 33/265 |
| 4,220,983 A | * | 9/1980 | Schroeder | 362/114 |
| 4,638,565 A | * | 1/1987 | Podany et al. | 33/265 |
| 6,079,111 A | * | 6/2000 | Williams et al. | 33/265 |
| 6,122,833 A | * | 9/2000 | Lorocco | 42/132 |
| 6,216,352 B1 | * | 4/2001 | Lorocco | 42/145 |
| 6,247,237 B1 | * | 6/2001 | Redburn et al. | 33/265 |
| 6,581,317 B1 | * | 6/2003 | Slates | 42/132 |
| 6,601,308 B1 | * | 8/2003 | Khoshnood | 33/265 |
| 6,609,306 B1 | * | 8/2003 | Johnson et al. | 33/265 |
| 6,684,557 B1 | * | 2/2004 | Yu | 43/17.6 |

FOREIGN PATENT DOCUMENTS

DE    4030203 A1  *  4/1991

OTHER PUBLICATIONS

The Led Light.com web site, printed on Aug. 6, 2002, pp. 1-4.

(Continued)

*Primary Examiner*—Michael J. Carone
*Assistant Examiner*—Bret Hayes
(74) *Attorney, Agent, or Firm*—Morriss O'Bryant Compagni

(57) ABSTRACT

This invention provides method of rapidly charging a glow-in-the-dark material utilizing an ultra violet emitting LED in portable form to produce a long lasting illuminating effect. The method includes providing a structure having a glow-in-the-dark material incorporated therein and exposing the glow-in-the-dark material to ultra violet light emitted from the LED to charge the glow-in-the-dark material for a period of time. The method of charging a glow-in-the-dark material is applicable to all types of sporting activities where such glow-in-the-dark materials are used, such as hunting and fishing, as well as other known applications.

15 Claims, 2 Drawing Sheets

OTHER PUBLICATIONS

BIVAR, Bivar Introduces Industry First High Powered 400nm Ultraviolet LED, web page printout (www.bivar.com), California, Feb. 7, 2002.

Nichia American Corporation, Development of Ultraviolet (365 nm) 100 mW LED, web page printout (www.nichia.com), Sep. 26, 2002.

* cited by examiner

METHOD AND APPARATUS FOR CHARGING EFFLORESCENT MATERIAL UTILIZING ULTRA VIOLET LIGHT

BACKGROUND OF THE INVENTION

1. Field of the Invention

This invention relates generally to efflorescent material primarily in sporting good applications such as archery and fishing, and more particularly to a method and apparatus for quickly and effectively charges a glow-in-the-dark material for use in such sporting good activities.

2. Description of the Art

Recently, there has been developed a light emitting diode (LED) that emits visible and invisible ultra violet light. Even more recently, such LED's have been incorporated into small hand-held pen lights and other small portable flashlights. Such LED pen lights have been produced with specifications which include an output power of 1,000 uW, peak wavelengths of about 375 nm, narrow focus lenses of about 10 degrees or wider field lenses of about 100 degrees, and a spectrum half width of 12 nm. LED's typically have extensive life spans, compared to conventional fluorescent tubes or light bulbs and will often have an average life span of 2,000 hours or more. The use of 375 nm light is UVA light, or long wave UV, which is generally safer to the human eye than UVB or UVC and is just below the human eye visible light range.

Such UV pen lights have been employed for such uses as document and forgery analysis by showing alterations or changes when exposed to UV light, crowd and access control by illuminating invisible marks on a hand or card, and crime scene inspection by illuminating various bodily fluids. In addition, such UV lights have been employed in currency and bill verification since many currencies now include UV fluorescing strips. Leak detection by adding a UC powder or liquid to a system with a leak and using a UC light source to quickly detect leaks is another use for such UV lights, as well as rodent detection by illuminating urine, scientific, laboratory and educational analysis, UV curing, medical skin treatments, EPROM erasure, painting and rug repair detection, and gemstone and mineral inspection. Such LED UV light sources, however, have not been employed to charge a glow-in-the-dark material.

Various sporting good products have taken advantage of the illumination properties of various glow in the dark materials to provide illumination in low light conditions. Such efflorescent materials are now used on items from bow sights to fishing lures. When used on bow sights, Bow sights the sight pins are provided with a light-gathering fiber optic element to enable use of the sighting device in low light environments. Various configurations of sight pins using fiber optic members have been proposed.

Despite the light-gathering capabilities of fiber optic elements which render sighting devices more useful in low-light conditions (e.g., dusk), there is a point at which the ambient light is so low that the fiber optic element is no longer capable of gathering sufficient light to provide any illumination. Various direct lighting techniques have been employed in which a small light source is directly coupled to the fiber optic element in order to illuminate the sight pins. In addition, it has also been proposed to provide a self illuminating substance such various glow-in-the-dark materials to one end of a fiber optic element or along its length in order to illuminate the opposite visible end in low light conditions.

In fishing lure applications, glow-in-the-dark materials have been incorporated into the construction of the lure itself in order to illuminate the fishing lure under water. This is thought to provide better visible for fish to more quickly visually locate the lure, especially in deep water where light conditions are generally poor.

In either case, archery or fishing, there is a need to quickly charge the glow-in-the-dark material. In addition, there is a need to quickly charge the glow-in-the-dark material in a manner that will cause the illuminating properties of the material to last. Typically, such glow-in-the-dark materials are charged by exposing them to ambient light, such as sunlight, or by shining light from a light source, such as a flash light, on the material. While such techniques do cause the material to become charged, the illumination time is relatively short lived. Thus, it would be advantageous to provide a means for causing a glow-in-the-dark material quickly and in a manner that produces an extending illumination time of the material.

SUMMARY OF THE INVENTION

In accordance with the present invention, a UV LED light source is employed to charge the illumination properties of a non-electric light source, hereinafter referred to as a "glow-in-the-dark material," which provides illumination for a period of time subsequent to being charged. The non-electric light source is a material which emits light, such as a chemically activated material commonly used in such devices as illuminated watches and glow-in-the-dark signage. In addition, zinc sulfide and copper mixed phosphorescent pigments and powder materials can be incorporated into many materials such as plastics. Such luminescent plastic materials may be formed by mixing luminescent pigment powder with transparent plastic resin. The luminescent plastic can then be formed into the desired shape or applied to the product by casting, molding, extruding, dipping and/or coating. The luminescent pigment is compatible with acrylics, polyester, epoxy, polyvinyl chloride, polypropylene and polyethylene polymers.

In the case of fishing lures, the UV LED is turned on and shined upon the entire surface of the glow-in-the-dark material. Because of the unique illuminating properties of the UV light, as compared to white light, the portions of the glow-in-the-dark material that have been exposed to the UV light will appear to glow, even under high ambient light conditions such as direct sunlight, when exposed to the UV light. As such, a user will easily be able to see which portions of the glow-in-the-dark material have been charged in order to ensure that all surfaces of the entire glow-in-the-dark structure have been charged.

In the case of a bow sight, the UV LED light source may separate from or integrated with the bow sight so as to be selectively positionable relative to the glow-in-the-dark features of the bow sight, such as those used to illuminate various fiber optic elements to provide illumination thereto. Likewise, the UV LED light source may be employed to charge sighting elements that themselves that are constructed of glow-in-the-dark materials, as by casting, molding, extruding, dipping and/or coating so that the luminescent material is incorporated into the sighting element.

In the case where the UV LED light source is attached to the bow sight, the UV LED light source may be mounted to a bracket or component of the sight, such as the pin guard or pin plate. In addition, various light shields may be employed to shield the UV light from being directed toward the user, while allowing the light to shine upon the glowin-the-dark sighting element. As such, the UV LED may be activated to cause the efflorescent material to glow while continuing to allow the user to focus upon the sighting elements without risk of UV light exposure to the eyes of the user.

This same concept of quick charging glow-in-the-dark material may be employed for other uses, such as firearm sighting elements, safety measures as when providing glow-in-the-dark indicia on aircraft or sea craft and the like, charging the face of a watch containing glow-in-the-dark indicia as when diving, and any other use in which it may be desirable to charge a glow-in-the-dark material.

DETAILED DESCRIPTION OF THE INVENTION

Figure 1:
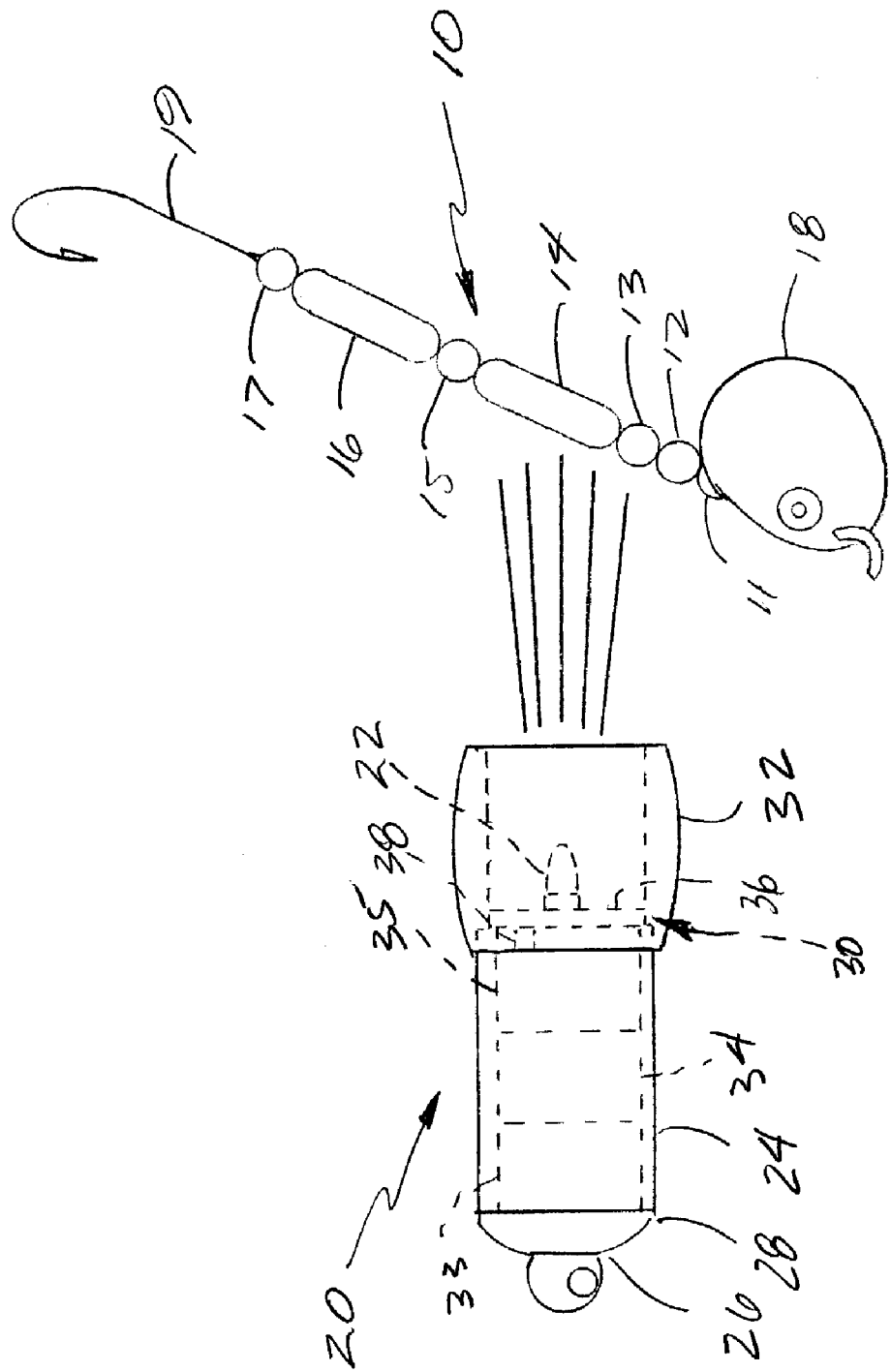
FIG. 1 is a side view of a portable UV LED flash light directing UV light onto a fishing lure comprised of a glow-in-the-dark material.

FIG. 1 illustrates a method of quickly charging a glow-in-the-dark material disposed on a fishing lure, generally indicated at 10. The fishing lure 10 is provided to show a representative example of a fishing lure that is known in the art and contains one or more glow-in-the-dark elements for providing self-illumination of the fishing lure 10 under water. The fishing lure 10 is comprised of a plurality of beads 11–17, which are strung together and thus interconnected between a head member 18 and a hook 19. One or more of the beads 11–17 is comprised of a material, such as plastic, that has been impregnated with glow-in-the-dark material.

The glow-in-the-dark material is a material which emits light after being exposed to a light source, such as a chemically activated material commonly used in such devices as illuminated watches and glow-in-the-dark signage. Zinc sulfide and copper mixed phosphorescent pigments and powder materials can be incorporated into many materials such as plastics. Such luminescent plastic materials may be formed by mixing luminescent pigment powder with transparent plastic resin. The luminescent plastic can then be formed into the desired shape or applied to the product by casting, molding, extruding, dipping and/or coating. The luminescent pigment is compatible with acrylics, polyester, epoxy, polyvinyl chloride, polypropylene and polyethylene polymers.

The light source, generally indicated at 20, is a relatively small, portable flashlight containing one or more LED's 22 that emit ultra violet light. The flashlight 20 is comprised of an elongate cylindrical battery housing 24 having an end cap 26 attached to a proximal end 28 and a the LED light assembly 30 housed within a rotatable switch housing 32. A plurality of batteries 33, 34 and 35 are contained within the battery housing 24. By rotating the switch housing 32, contact is made between the circuit board 36 to which the LED 22 is coupled and the housing 24 to cause a current to flow through the LED 22. Electrical contact is also made between the circuit board 36 and the battery 35, by a small spring 38 interposed between the circuit board 36 and the battery 35.

The LED 22 emits visible and invisible ultra violet light. The LED has an output power of approximately 1,000 uW, a peak wavelength of about 375 nm, a narrow focus lense of about 10 degrees, and a spectrum half width of 12 nm. By utilizing a 375 nm light, UVA light, or long wave UV light, is produced which is generally safer to the human eye than UVB or UVC and is just below the human eye visible light range. Such light, however, rapidly charges glow-in-the-dark materials at a much more rapid rate than white light alone, which includes UV light, but at a much lower intensity than that emitted by sunlight or other portable light sources, such as conventional flashlights utilizing a light bulb. For example, a glow-in-the-dark material may be charged in five seconds or less using a single UV LED, while an equivalent intensity charge would take several more seconds using a conventional bulb-type flashlight. In addition, because of the frequency range of the UV light and the visibility thereof, it is less susceptible to being detected by game than is white light, that may otherwise startle any game being hunted in low light conditions. Thus, there is an enormous advantage to using low intensity visible light to charge the glow-in-the-dark material of an archery sight as compared to conventional methods of white light flashlights.

In addition to charging at a faster rate, the use of an LED light source to charge a glow-in-the-dark material produces a much more intense glowing effect than can be achieved using conventional white light sources. Thus, once charged by a UV LED, the glow-in-the-dark material will continue to glow for an extended period of time compared to charging by a white light source of similar intensity.

Thus, in the case of the fishing lure 10, the UV LED flashlight 20 is turned on and directed toward one or more surfaces of fishing lure comprised of glow-in-the-dark material. As previously mentioned, because of the unique illuminating properties of the UV light and its effect on charging such glow-in-the-dark materials, as compared to white light, the portions of the fishing lure 10 containing glow-in-the-dark material that have been exposed to the UV light will appear to glow, even under high ambient light conditions such as direct sunlight, when exposed to the UV light. As such, a user will easily be able to see which portions of the glow in the dark material have been charged in order to ensure that all surfaces of the entire glow in the dark structure have been charged.

Figure 2:
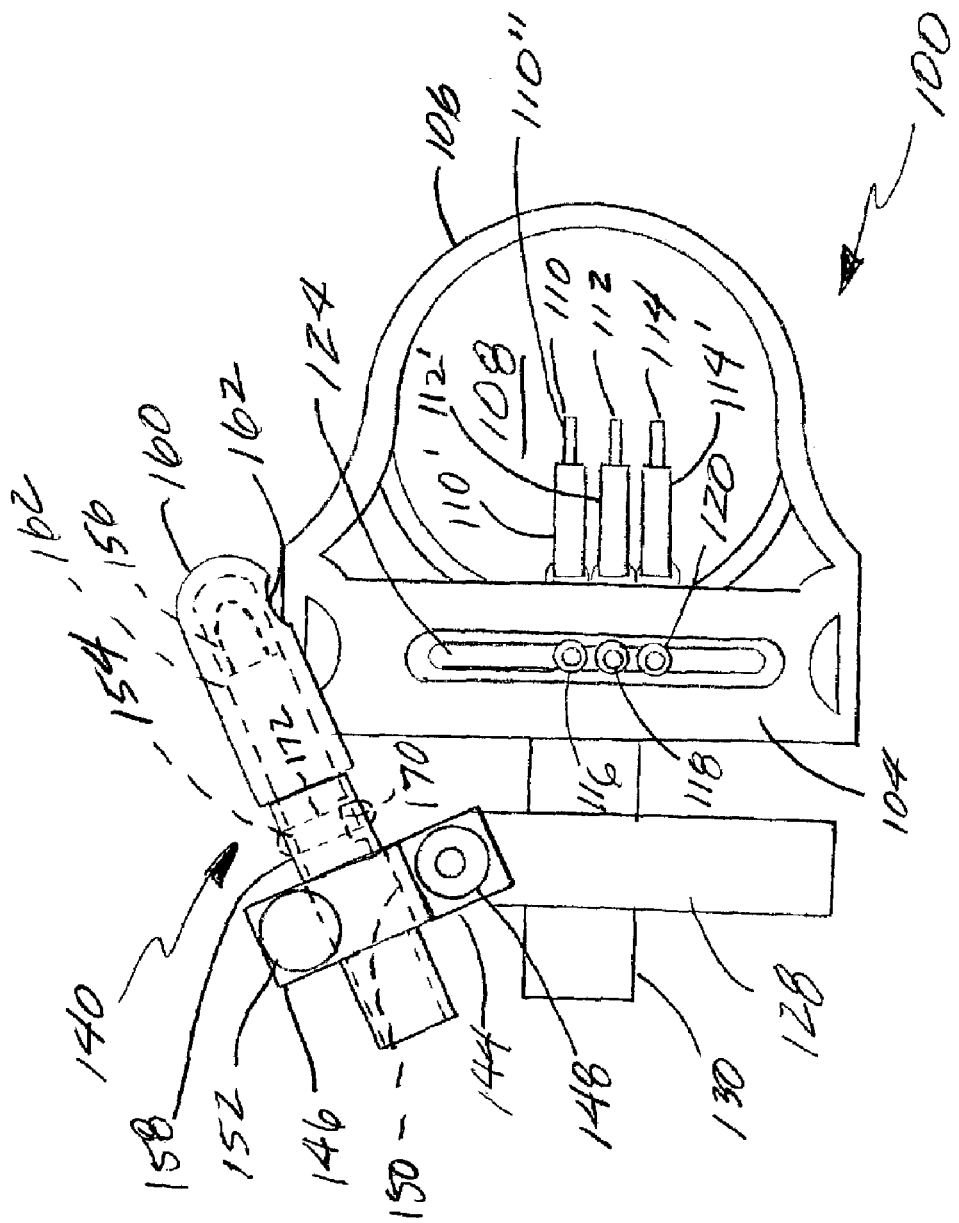
FIG. 2 is a front view of an archery bow sight having an LED UV light source attached to the bow sight.

FIG. 2 illustrates a bow sighting device, generally indicated at 100 configured for attaching or coupling to an archery bow (not shown). The sighting device 100 is comprised of a pin plate 104, a pin guard 106 and a sight window 108 formed therebetween. A plurality of sight pins 110, 112, and 114 are secured to the pin plate 104 by threaded fasteners 116, 118 and 120, respectively, which engage the sight pins 110, 112 and 114 and extend through a slot 124 formed in the pin plate 104. The sight pins 110, 112, and 114 extend transversely from the pin plate 104 into the sight window 108. Each sight pin 110, 112 and 114 is provided with a glow-in-the-dark housing 110', 112' and 114' that covers at least a portion of a fiber optic element of each sight pin to provide illumination of the fiber optic element in low light conditions. The sighting device 100 is attached to a first bracket 128 by securement member 130. The first bracket 128 may be adjustably connected to a second bracket (not shown) for attachment to a bow.

A LED UV flashlight, generally indicated at 140 is attached to the bracket 128 with a mounting member 142. The mounting member 142 is comprised of an attachment portion 144 and a clamping portion 146. The attachment portion is attached to the bracket 128 as with a threaded fastener 148. The clamping portion is provided with a transversely extending aperture 150 for receiving a portion of the flashlight 140 therein and a clamping fastener 152 for tightening the aperture 150 around the body of the flashlight 140. The mounting member 142 allows a user to orient the LED flashlight 140 at any angle relative to the sight pins 110, 112 and 114 so as to direct the UV light directly toward the glow-in-the-dark portions thereof.

In this example, the LED flashlight 140 is comprised of an elongate housing 154 to which a UV emitting LED 156 is secured. The housing 154 is encased in a protective sleeve 158, formed from a flexible plastic or rubber material, that encases the housing 154 and allows the clamping portion 146 to grasp the housing 154 without damaging it. A light shield 160 is provided over the distal end 162 of the housing and the LED 156. The light shield 160 is provided with an opening 162 that allows light being emitted from the LED 156 to shine through the opening 162. By orienting the opening 162 toward the glow-in-the-dark portions 110', 112' and 114' of the sight pins 110, 112 and 114, when the LED is turned on, the glow-in-the-dark portions will be quickly charged while at least partially shielding UV light from being directed toward the eyes of the user.

In addition, the light shield 160 may be rotated relative to the housing 154 so as to change the direction of light being emitted through the opening 162. Thus, the intensity of light from the UV LED 156 onto the pins 110, 112 and 114 may be altered by orienting the opening 162 toward or partially away from the sight pins 110, 112, and 114. Moreover, the light shield 160 can be oriented so as to expose the sight pins 110, 112, and 114 to UV light while shielding such light in a direction away from the user. As such, the light shield prevents, at least to a large extent, UV light being directed toward a target that may otherwise startle such game.

Furthermore, the mounting member 142 is configured to be pivotable relative to the bracket 128 about the fastener 148 to move the led 156 closer to or further from the sight pins 110, 112, and 114 as desired to change the intensity of the UV light exposure on the pins. In addition, the fastener 152 is a knob which can be grasped by a user to adjust the clamping force on the housing 154. By decreasing the clamping force, the user can then slide the housing 154 relative to the mounting member 142 to further position the LED 156 closer to or further from the pins. Moreover, to further increase the exposure of the UV light on the pins, the light shield 160 may be completely removed in order to fully expose the LED 156. Thus, the intensity of exposure to the pins can be selectively adjusted by the user. This has particular utility when using such an UV LED light source with sight pins or other sighting devices known in the art that utilize fiber optic elements without an associated glow-in-the-dark material. Because the fiber optic elements, such as fiber optic element 110", exhibit flourescent properties under UV light, they will glow at a relatively high intensity when exposed to UV light. In some conditions, however, as when shooting from a darkened blind into a brightly light area, it may be desirable to decrease the intensity of the illumination of the fiber optic element. Thus, the adjustability of the UV LED light and its intensity or amount of exposure on the fiber optic element of the present invention allows the user to change the brightness of the fiber optic sighting element as desired.

The UV LED flashlight 140 is provided with an exposed and/or user accessible on button 170, which may be selectively accessed by a user so as to activate the LED light 156. If it is desirable to keep the LED light on, one or more o-rings 172 may be placed around the sleeve 158 so as to hold the button 170 in a depressed or on position as desired.

The bow sight 100 and fishing lure 10 are but single examples of the types of archery and fishing products available that incorporate glow-in-the-dark materials therein. As such, the present invention is intended to cover use of a portable UV LED light source with such fishing and hunting devices. In addition, the present invention is intended to cover any use of a UV LED flashlight which includes the charging of a glow-in-the-dark substance, with fishing and hunting examples providing what is believed to be the best application of the invention at the present time. For example, such use may extend to toys, licenced property, light sabers, marine applications such as locating buoys for lobster traps by shining the UV light to locate the buoys, mining industry, and the like.

Thus, while the present invention has been described with reference to certain embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. The principles of the present invention may be adapted to any use of an UV LED light for charging a glow-in-the-dark material for use in low light conditions. The claims provided herein are intended to cover such modifications and combinations and all equivalents thereof. Reference herein to specific details of the illustrated embodiments is by way of example and not by way of limitation.

What is claimed is:

1. A method of charging a glow-in-the-dark material, comprising:
    providing an ultra violet light emitting LED in portable form, said LED primarily emitting ultra violet light;
    providing at least one structure comprising a glow-in-the-dark material; and
    exposing the glow-in-the-dark material to ultra violet light emitted from the ultra violet light emitting LED to charge the glow-in-the-dark material for a period of time such that the glow-in-the-dark material emits light for a period of time after exposure to the ultra violet light emitting LED has stopped.

2. The method of claim 1, wherein the providing the at least one structure comprises providing at least one sighting indicia of a bow sight.

3. The method of claim 2, wherein said providing at least one sighting indicia comprises providing a bow sight.

4. The method of claim 3, further comprising attaching the ultra violet light emitting LED relative to the bow sight.

5. The method of claim 4, further comprising providing a shield for the ultra violet light emitting LED for selectively directing the ultra violet light from the ultra violet light emitting LED toward the at least one sighting indicia.

6. The method of claim 4, further comprising attaching the ultra violet emitting LED to the bow sight in a manner which allows adjustability of the position of the ultra violet light emitting LED relative to the bow sight.

7. A method of charging a glow-in-the-dark material, comprising:
    providing an ultra violet light emitting LED in portable form, said LED primarily emitting UVA ultra violet light;
    providing at least one bow sight comprising a fiber optic material to provide at least one sighting indicia;
    providing a glow-in-the-dark material in association with the fiber optic material; and exposing the fiber optic material to said UVA light emitted from the LED to illuminate the fiber optic material and thereby charge the glow-in the dark material in association therewith.

8. The method of claim 7, wherein providing a glow-in-the-dark material in association with the fiber optic material further comprises providing a glow-in-the-dark material in association with the fiber optic material to illuminate the fiber optic material in low light conditions.

9. The method of claim 7, further comprising attaching the LED relative to the bow sight.

10. The method of claim 9, further comprising providing a shield for the LED for directing the ultra violet light from the LED toward the at least one sighting indicia.

11. The method of claim 9, further comprising attaching the ultra violet LED to a bracket of the bow sight.

12. The method of claim 1, wherein said ultra violet light has a peak wavelength of between about 290 nm and about 380 nm.

13. The method of claim 12, wherein said ultraviolet light comprises primarily UVA light having a peak wavelength of between about 320 nm and about 380 nm.

14. The method of claim 13, wherein said UVA light has a peak wavelength of about 375 nm.

15. The method of claim 7, wherein said UVA light has a peak wavelength of about 315 nm.

* * * * *